Dec. 24, 1940. C. W. GUSTAFSON 2,226,491
SELF-LOCKING SCREW, BOLT, NUT, OR THE LIKE
Filed Aug. 10, 1939
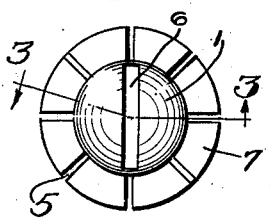
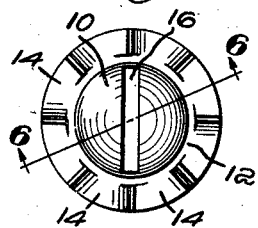
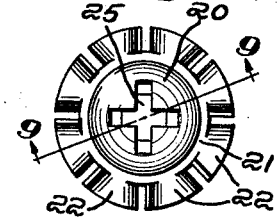
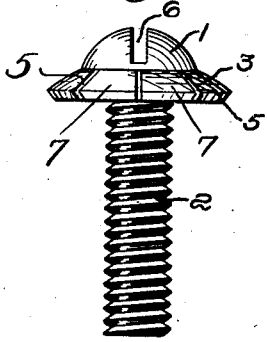
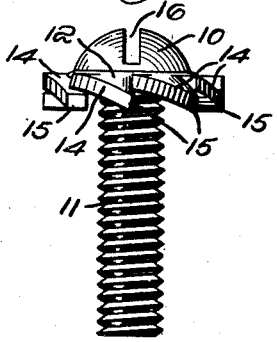
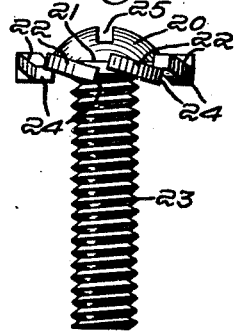
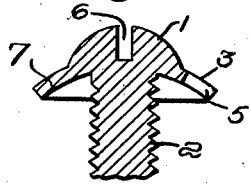
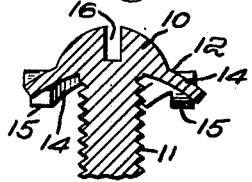
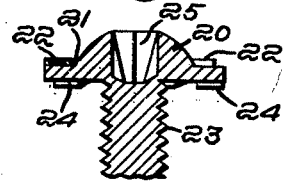
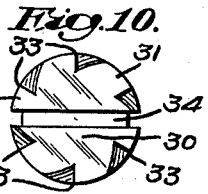
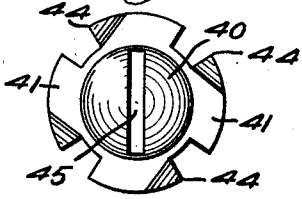
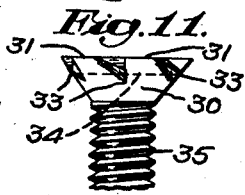
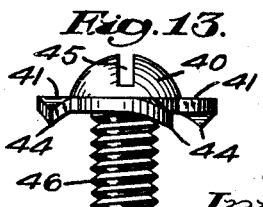
Inventor:
Carl W. Gustafson
By James R. Hodder
Attorney Patented Dec. 24, 1940

2,226,491

UNITED STATES PATENT OFFICE 2,226,491

SELF-LOCKING SCREW, BOLT, NUT, OR THE LIKE

Carl W. Gustafson, New Bedford, Mass., assignor to Continental Screw Company, New Bedford, Mass., a corporation of Massachusetts Application August 10, 1939, Serial No. 289,412

1 Claim. (Cl. 151—32)

My present invention is a novel and improved self-locking screw, bolt, nut or the like, wherein the head is provided with integral means to automatically produce a self-locking action against rotation to prevent untwisting, unscrewing, or an unthreading action.

In carrying out my present invention, I may position and arrange the integral self-locking means on the head in various ways, forms, and different constructions, or with a combination of the same. Thus, I may form the head with an integral rim or flange which extends radially substantially on a level with the bottom of the head and may be so constructed and arranged as to constitute the self-locking device. For this purpose, the rim or flange is formed into a plurality of independent and symmetrical locking portions disaligned from the bottom of the head and preferably with each of said portions twisted so that it will engage the article to which the screw or bolt is attached before it is driven "home," thus effecting a binding and locking action thru the resiliency of each radially extending portion.

Also, I may so form such rim or flange either when concave or flat with one or more angularly positioned or down-turned points, portions, edges or the like as by cutting or breaking the flange radially in one or more points and distorting the rim from its original position. Such a breaking of the flange into self-locking points or edges may be combined with the concave feature, thus giving a plurality of individual resilient and "spring" effects, in addition to the projecting edge, rim, prong, or the like which will "dig in" to the article to which the screw or bolt is being attached, and thus prevents unscrewing rotation and locks the same against working loose.

The self-locking feature, or features, may be formed on any type of screw-head and either as a feature of the separate rim or flange, or directly in the head portion as, for example, in the usual type of wood screw-head, wherein the outermost portion of the head can be provided with my self-locking device, or devices, preferably a plurality of the same.

Thus, the feature of one, or more, wedge-like or angular member, or members, formed integral with the screw-head, either as a flange or otherwise, and either with the concave resilient feature or without the same, constitutes an embodiment of my present invention and provides an automatic self-locking screw structure independently of separate locking washers or devices. Preferably also, my improved self-locking instrumentalities being formed integral with the head may be made during the usual heading and manufacturing operations.

Thus, it is feasible to break or twist the rim or rim portions of the screw head or bolt, depressing the broken edge of each section downwardly to effect the impinging angular wedge-like device. Also, it may be and frequently is desirable to cut out a substantial portion of the rim between such self-locking portions which will thus form each of said rim-like locking members as a separate integral wedge, either with the concave structure, with "spring" and resiliency in each section independently of each other, or in a flat, rigid rim construction.

While I prefer to form my improved device on a header, it is of course feasible to form the serrated type of locking rim or ring in a press after the heading operation.

My self-locking construction may be employed with any type of screw-head, bolt-head, or the like and whether for use with the usual slotted screw-head or with any design of socket type screw-head, as will be further explained.

Referring to the drawing illustrating preferred embodiments of my present invention:

Fig. 1 is a plan view of my invention embodying the concave locking rim;

Fig. 2 is a side view;

Fig. 3 is a cross-sectional view of the head portion with a part of the shank omitted;

Fig. 4 is a plan view of my self-locking screw-head with a concave flange formed in a plurality of self-locking members;

Fig. 5 is a side view;

Fig. 6 is a cross-sectional view of the head portion with a part of the shank broken away;

Fig. 7 is a plan view of a straight flange structure with a plurality of separated portions formed into angular self-locking position;

Fig. 8 is a side view;

Fig. 9 is a cross-sectional view of the head with a part of the shank broken away;

Fig. 10 is a plan view of a wood screw type of head embodying my self-locking invention;

Fig. 11 is a side view of same;

Fig. 12 is a plan view of a still further modified form wherein a plurality of separated flange portions have a part of such flange substantially flat and the end portion only formed into angular self-locking position, and Fig. 13 is a side view of same.

Referring to the drawing wherein I have illustrated various modifications and have also shown the same incorporated with different types of slotted and socket head structures which, it will be appreciated, may be utilized interchangeably with either type of my integral self-locking rim, flange, or head construction.

As shown in Fig. 1, a typical bolt is illustrated having a head 1, threaded shank 2, and in this form an integral concave rim or flange 3 in the head 1. This flange 3 is formed with a substantially concavo-convex construction with a concave surface adjacent the threaded shank portion so that the rim will thus engage the surface, article, or member to which the bolt is being attached before the head is "driven home," and is of some resiliency to effect a binding, biting, locking frictional engagement between the head and said article, in addition to the "digging in" action of the corners of each portion of the rim.

The integral concave rim 3 is cut radially, as shown at 5—5, into a plurality of independent yielding portions 7—7, each portion capable of "digging in" somewhat to the articles to which the screw is attached and presenting a sharp edge against retraction. In this form, I have illustrated a typical sawed slot 6 in the head 1 but it may, of course, be formed with a socket and either round, square, hexagon, or other contour.

In Fig. 4 I have illustrated a construction of bolt having a head 10, threaded shank 11, and a rim portion 12 also formed somewhat concavo-convex and broken, twisted, or otherwise formed into a plurality of sections 14, each section so formed in angular relationship to the head 10 as to present a wedge-shaped locking edge 15 as clearly shown in Figs. 5 and 6. In this form I have also illustrated the usual screw slot 16, although the head may be fitted for use with a socket wrench if desired.

In Fig. 7 I have illustrated a further modification wherein the head 20 has a locking flange 21 extending substantially flat or straight and perpendicular to the axis of the screw and shank portion 23 and with said flange then formed into a plurality of wing portions 22—22 and bent, twisted, or angularly positioned relatively to the head 20 to present a series of locking corners 24, which will dig into the surface of the article to which the bolt is attached. In this form I have illustrated a typical socket recess 25 in the head 20.

In Fig. 10 I have illustrated a still further modification illustrating a wood screw type of head 30 with the self-locking integral devices in the topmost rim of the head, which rim may be a slot extension, if desired, similar to that shown in the foregoing described figures, which may be simply cut into the rim itself, as shown at 31—31, which rim portion is provided with a downwardly formed locking prong or edge 33. A slot 34 is formed in the head for engagement with a screwdriver and the shank 35 is threaded to any desired pitch, and either as a bolt, like the foregoing described figures, as a gimlet screw.

In Fig. 12 I have shown a still further modification, wherein the head 40 is provided with separate integral wings 41—41 having substantial spaces therebetween with the material cut out, and which wings are herein shown as having a flat portion throughout their peripheral area and with a down-turned edge, as shown at 44, constituting the locking part to impinge or dig into the surface to which the screw is attached and prevent untwisting, unthreading, or working loose and thus constituting a self-locking instrumentality integral with the head. Either a recess for a socket wrench can be employed, of course, or, as herein shown, the slot 45 and the threaded shank 46 may be of any length, pitch, or contour and, if desired, of the so-called self-tapping type. In fact, my entire invention is peculiarly beneficial to a self-tapping type of bolt as it would be automatically locked when "driven home" into final holding position.

I claim:

A metallic fastener of the kind described, comprising a shank portion and a head, said head being of greater diameter than the shank, and having integral therewith a peripheral rim extending beyond the diameter of the head adjacent the junction of the head and shank, said peripheral rim being divided into a plurality of separately extending wing portions, each wing having its edge formed on a radial line relatively with the axis of the shank, said peripheral rim portions being of substantially equal thickness throughout their area, and having an edge of each wing twisted at a predetermined angle in disalignment horizontally with the peripheral portion of the head to which said wing is attached, and constituting an integral locking means on the head against unthreading.

CARL W. GUSTAFSON.